United States Patent [19]

Naruse et al.

[11] Patent Number: 4,802,616
[45] Date of Patent: Feb. 7, 1989

[54] SYSTEM FOR POSITIONING AUTOMOTIVE VEHICLE SIDE BODY

[75] Inventors: Kazuo Naruse, Okazaki; Mikio Kitano; Hideaki Tobita, both of Toyota, all of Japan

[73] Assignee: Toyota Jidosha Kabushiki Kaisha, Japan

[21] Appl. No.: 933,870

[22] Filed: Nov. 24, 1986

[30] Foreign Application Priority Data

Nov. 29, 1985 [JP] Japan .................... 60-184169[U]

[51] Int. Cl.⁴ .................... B23K 9/12; B23K 37/04
[52] U.S. Cl. .................... 228/4.1; 228/49.1; 228/47
[58] Field of Search .................... 228/4.1, 47, 49.1

[56] References Cited

U.S. PATENT DOCUMENTS

| | | | |
|---|---|---|---|
| 4,404,451 | 9/1983 | Niikawa et al. | 228/47 X |
| 4,535,927 | 8/1985 | Matsubara et al. | 228/47 X |
| 4,538,044 | 8/1985 | Kadowaki et al. | 228/47 X |
| 4,600,136 | 7/1986 | Sciaky et al. | 228/4.1 X |
| 4,606,488 | 8/1986 | Yanagisawa | 228/45 |
| 4,667,866 | 5/1987 | Tobita et al. | 228/49.1 X |

FOREIGN PATENT DOCUMENTS 58-49194 11/1983 Japan .

*Primary Examiner*—Fred A. Silverberg
*Assistant Examiner*—Carmine Cuda
*Attorney, Agent, or Firm*—Finnegan, Henderson, Farabow et al.

[57] ABSTRACT

A system for positioning an automotive vehicle side body wherein slide rails for supporting a sliding conveyor for movement thereon in an automotive vehicle body assembly line is located, not on a floor of the assembly line, but at the same height as an underbody supported at a elevated location above the assembly line floor, so that an open space below the slide rails can be used for installing other necessary equipment.

4 Claims, 4 Drawing Sheets

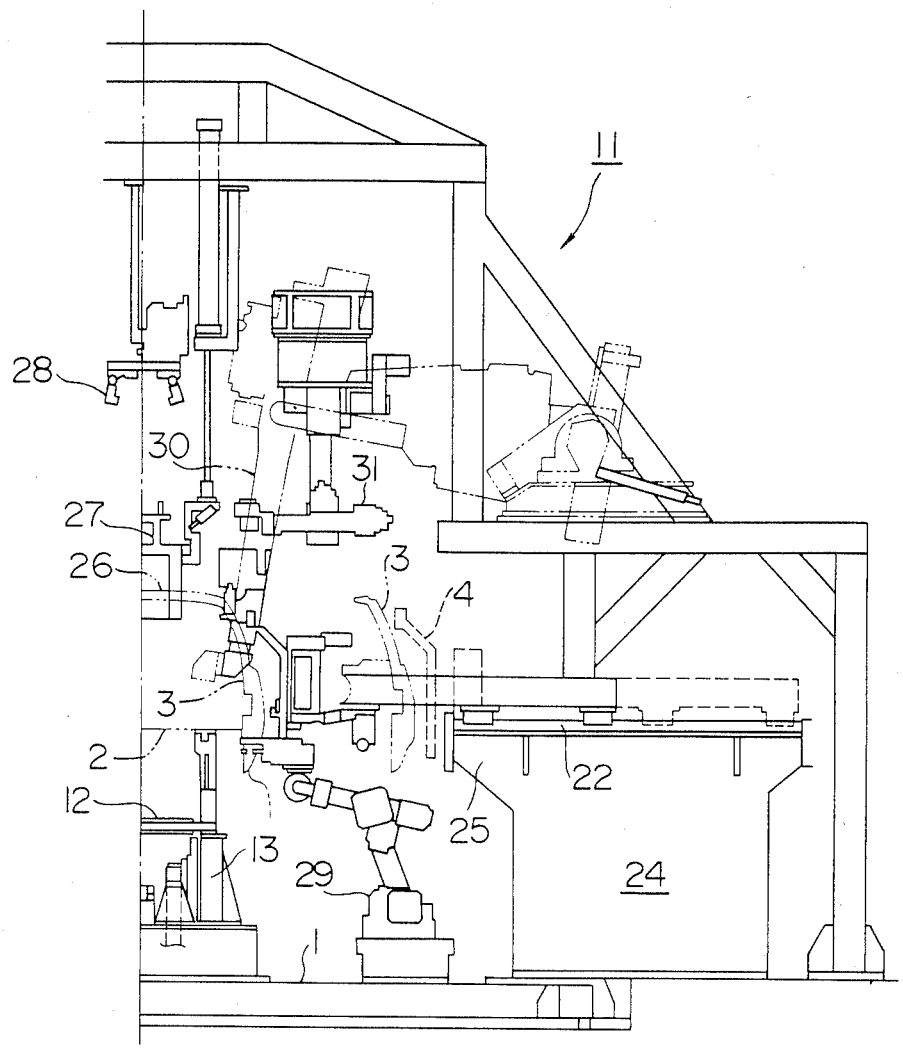
F I G. 3

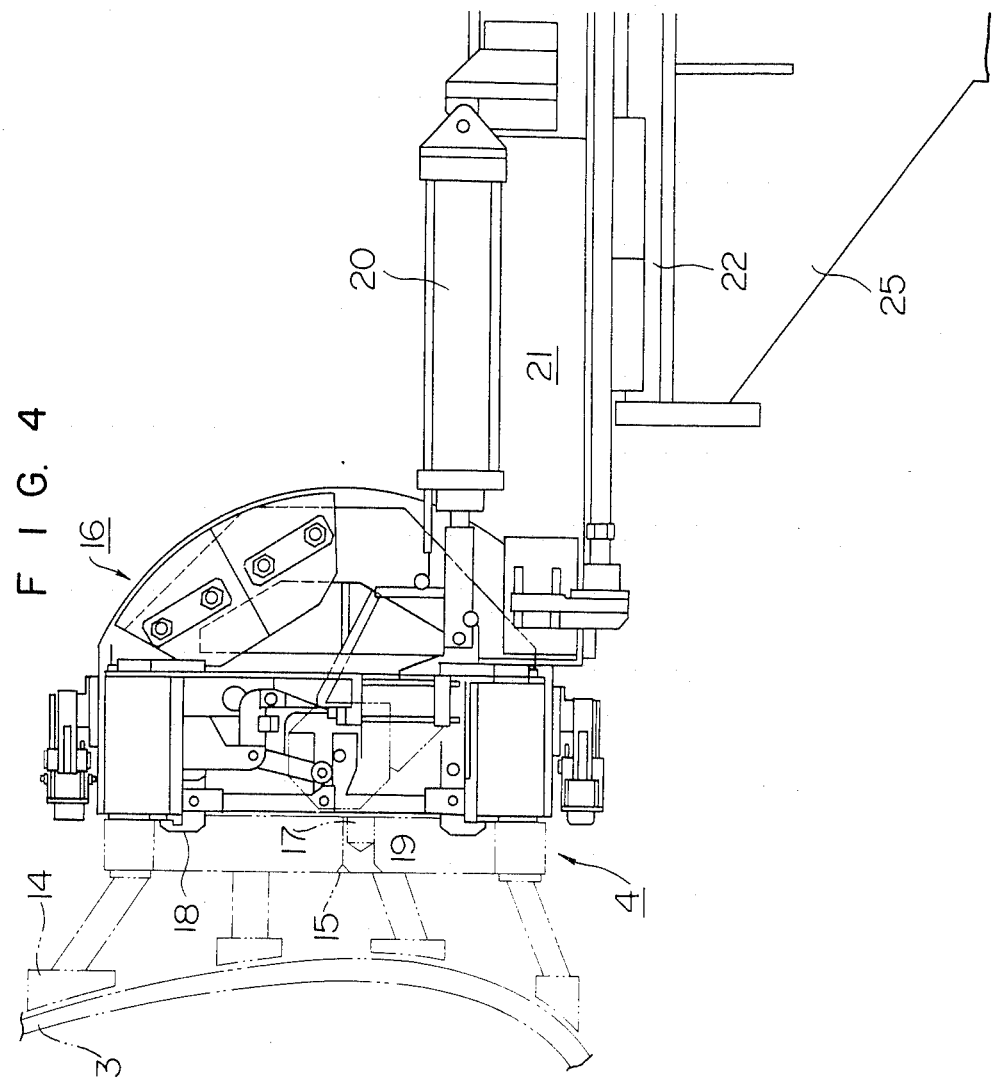

SYSTEM FOR POSITIONING AUTOMOTIVE VEHICLE SIDE BODY

BACKGROUND OF THE INVENTION

1. Field of the Invention

This invention relates to a system for positioning an automotive vehicle side body suitable for use with an automotive vehicle body assembly line.

2. Description of the Prior Art

On an automotive vehicle body assembly line, the assembling of a main body is usually carried out as follows. Two side bodies are moved forwardly from the left and right sides respectively toward an underbody supported at an elevated location above an assembly line floor, and positioned with respect thereto. Then, a roof is moved downwardly and positioned with respect to the side bodies, and the side bodies are joined to the underbody and roof by spot welding, to assemble the main body. FIG. 2 shows one example of the system for positioning the side bodies used nowadays in assembling a main body. This prior art is disclosed in Japanese Patent Examined Publication No. 49194/83 in FIG. 4 thereof. As shown, an underbody 2 is supported at an elevated location above an assembly line floor 1, and side bodies 3 are moved forwardly from the left and right sides respectively toward the underbody 2 and positioned with respect thereto. The side bodies 3 are each supported on a side body pallet 4 which is supported on a sliding conveyor 5 for pivotal movement between a horizontal position and a vertical position. The sliding conveyor 5 can be moved forwardly and rearwardly in sliding movement on slide rails 6 laid on the assembly line floor 1.

Two problems are encountered in the system of the prior art described hereinabove. One problem is that the sliding movement of the sliding conveyor 5 makes it necessary to provide an open space of a large size above the assembly line floor 1. Thus, in spite of the fact that it is necessary to install various types of equipment including welding robots in the vicinity of the assembled body, difficulty is experienced in securing a necessary space. The other problem is that the sliding conveyor can support thereon only one type of side body pallet 4, so that the type of side body that can be handled by the pallet and assembled on the assembly line is limited by the pallet. This makes it impossible to assemble different types of automotive vehicle bodies on the same assembly line.

SUMMARY OF THE INVENTION

This invention has been developed for the purpose of obviating the aforesaid problems of the prior art. Accordingly, the invention has as its object the provision of a system for positioning an automotive vehicle side body which enables different types of automotive vehicle bodies to be assembled on the same assembly line while providing a space in the vicinity of the assembled vehicle body for mounting necessary equipment for performing an assembling operation.

In the positioning system according to the invention, slide rails on which a sliding conveyor moves in sliding movement is not laid on the assembly line floor but is located at a location at the same level as an underbody supported high above the assembly line floor, so as to secure a space below the slide rails for mounting necessary equipment. The sliding conveyor supports thereon a swingable stool to which a side body pallet having a suitable type of jig can be clamped, so that the same side body pallet can be used for positioning different types of vehicle side bodies by using different types of jigs. As a result, it is possible to assemble various different types of automotive vehicle bodies on the same assembly line.

More specifically, the automotive vehicle side body assembling system according to the invention is suitable for use with an automotive vehicle body assembly line on which two side bodies are moved forwardly from the left and right sides respectively toward an underbody supported at an elevated location above the assembly line floor, and positioned with respect to the underbody before being joined thereto by spot welding. The side bodies are each supported on a side body pallet which has a jig suiting a particular type of automotive vehicle body to be assembled. The side body pallet with the jig is positioned and clamped on a swingable stool by means of a guide pin and a pin receiving opening. This makes it possible to support a side body pallet having a different type of jig on the swingable stool which is movable between a horizontal position and a vertical position with respect to a sliding conveyor movable in sliding movement on slide rails laid on a top surface of a frame located on the assembly line floor. The slide rails are located at the same elevation as, and extend toward, the underbody. By this arrangement, it is possible to provide an open space extending horizontally between the frame and the automotive vehicle body and vertically between the slide rails and the assembly line floor for installing necessary equipment.

BRIEF DESCRIPTION OF THE DRAWINGS

FIG. 3 is a schematic view of a main body assembling system in which the side body assembling system shown in FIG. 1 can be incorporated; and FIG. 4 is a schematic view of the essential portions of the system shown in FIG. 1.

DESCRIPTION OF THE PREFERRED EMBODIMENT

Figure 1:
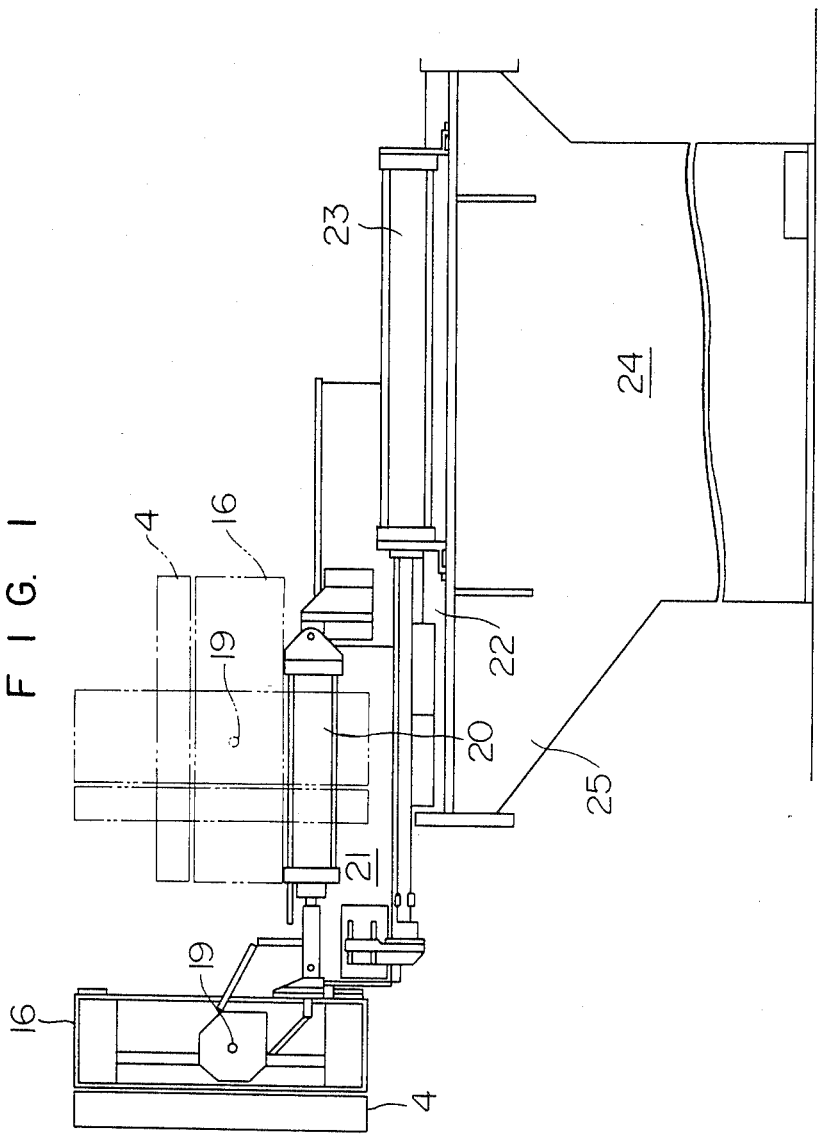
FIG. 1 is a schematic view of the system for positioning an automotive vehicle side body comprising one embodiment of the invention.
Figure 2:
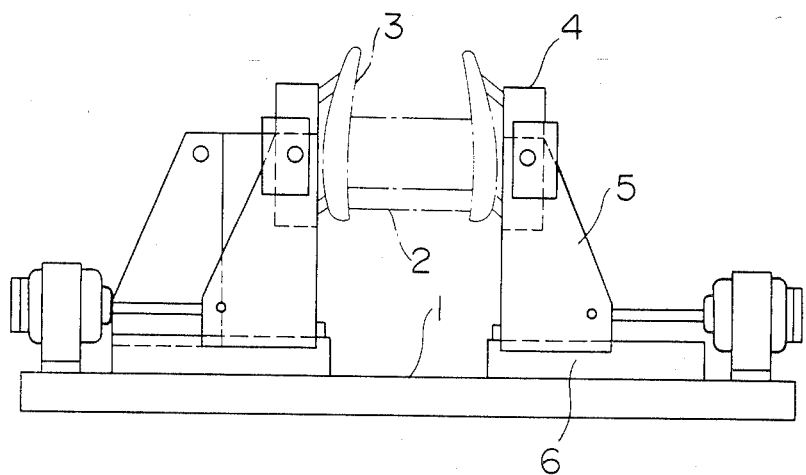
FIG. 2 is a front view of a side body positioning system of the prior art.

One embodiment of the system for positioning a side body in conformity with the invention will now be described by referring to FIGS. 1, 3 and 4.

FIG. 3 shows in a schematic view a main body assembling system generally designated by the reference numeral 11 in which the system for positioning a side body according to the invention can be incorporated. Positioned at a location high above an assembly line floor 1 is an underbody 2 which is supported on an underbody pallet 12 conveyed by a conveyor unit 13 into the main body assembling system 11.

Two side bodies 3 (only one of them being shown) are moved forwardly from the left and right sides respectively toward the underbody 2 and positioned with respect thereto. Each side body 3 is supported on a side body pallet 4 as shown in FIGS. 1, 3 and 4.

As shown in FIG. 4, a jig 14 is attached to the side body pallet 4 to hold the side body 3 in place. A plurality of types of jig 14 each suiting one of different types of automotive vehicle bodies are prepared and stored for use when necessary. By using the type of jig 14 which suits the particular type of automotive vehicle body, it is possible to handle different types of side body 3 by using the same side body pallet 4. The side body pallet 4 is formed with a pin receiving opening 15 in which a guide pin 17 fixed to a swingable stool 16 is inserted so as to position the side body pallet 4 with respect to the swingable stool 16. Then, the pallet 4 is firmly secured to the stool 16 by means of a clamp 18. This operation is performed while the swingable stool 16 on which the side body pallet 4 is clamped is disposed in a horizontal position. The swingable stool 16 is pivoted at 19 so that it can move between a horizontal position and a vertical position. A cylinder 20 is provided to move the swingable stool 16 in swinging movement between the two positions. A sliding conveyor 21 arranged on slide rails 22 is moved forwardly and rearwardly by a cylinder 23. The slide rails 22 are laid on top of a projection 25 located on an upper surface of a frame 24 located on the assembly line floor 1. The projection 25 is located at the same elevation as the underbody 2 and extends toward the underbody 2.

A roof 26 is supported on a roof pallet 27 and conveyed to the main body assembly system 11 by a conveyor device 28. After the underbody 2, side body 3 and roof 26 are positioned with respect to each other, they are joined by tack welding by means of welding robots 29, 30 and 31. In the next following process step, additional welds are made by a regular welding method to assemble a main body. Of the three welding robots 29, 30 and 31, the robot 29 is positioned in a space defined between the slide rails 22 and the assembly line floor 1, which is provided when the side body positioning system according to the invention is used.

Operation of the side body positioning system according to the invention will now be described. When the cylinder 23 for moving the sliding conveyor 21 is contracted, the sliding conveyor 21 is disposed in a retracted position (see FIG. 1). When the sliding conveyor 21 is in the retracted position, the cylinder 20 for moving the swingable stool 16 in swinging movement is extended to keep the stool 16 in the horizontal position. While the stood 16 is disposed in the horizontal position, the side body pallet 4 supporting the side body 3 is fed to the stool 16 and clamped thereto after the guide pin 17 is inserted in the pin receiving opening 15 to position the pallet 4 with respect to the stool 16. Then, the cylinder 23 for moving the sliding conveyor 21 is extended to move the sliding conveyor 21 forwardly. At the same time, the cylinder 20 for moving the stool 16 in swinging movement is contracted to move the same in swinging movement from the horizontal position to the vertical position. When the sliding conveyor 21 reaches an advance position, the stool 16 has completed its swinging movement into the vertical position so as to thereby position the side body 3 at a predetermined location. After the side body 3 is thus positioned, tack welding is performed by the welding robots 29, 30 and 31.

What is claimed is:

1. In an automotive vehicle body assembly line wherein two side bodies are moved forwardly along a body positioning path extending substantially perpendicular to an underbody conveyance path along which an underbody is supported at an elevated location above an assembly line floor for spot welding the sidebodies, a side-body positioning system, comprising:

a frame disposed on the assembly line floor and having an upper surface with an extreme forward edge and an opposite rear edge, said extreme forward edge opposing and spaced a predetermined lateral distance from the underbody conveyance path;

slide rail means mounted on said upper surface and extending axially in a direction defining the side body positioning path, said slide rails being mounted at an elevation substantially corresponding to the elevated location of the supported underbody;

a side body conveyor mounted on said slide rail means and movable in opposite directions along the side body coveyor path;

a stool having a pallet surface for removably supporting a pallet, said stool being mounted on said side body conveyor to pivot about a horizontal axis substantially perpendicular to the side body positioning path for positioning the plane of the pallet mounting surface in a first position substantially parallel to the upper surface of the frame and in a second position substantially perpendicular to the upper surface of the frame;

first means mounted on said upper surface of the frame for moving the conveyor along the rail means in the forward direction to a welding location for positioning the pallet mounting surface forward of the extreme forward edge of the upper frame surface; and second means including a cylinder and piston and piston rod assembly mounted on said side body conveyor and connecting said stool and side body conveyor operative to pivot said stool from the first to the second position for placing the pallet mounting surface at the welding location for welding the supported underbody to the sidebody, said pallet mounting surface being disposed horizontally at times when said piston rod is fully extended from said cylinder of the assembly.

2. The system of claim 1 wherein the stool is pivotal on an axis disposed at a level above the path of the piston rod of the second means for pivoting the stool between the first and second position.

3. In an automotive vehicle body assembly line wherein two side bodies are moved forwardly along a body positioning path extending substantially perpendicular to an underbody conveyance path along which an underbody is supported at an elevated location above an assembly line floor for spot welding the sidebodies, a side-body positioning system, comprising:

a frame disposed on the assembly line floor and having an upper surface with an extreme forward edge and an opposite rear edge, said extreme forward edge opposing and spaced a predetermined lateral distance from the underbody conveyance path;

slide rail means mounted on said upper surface and extending axially in a direction defining the side body positioning path, said slide rails being mounted at an elevation substantially corresponding to the elevated location of the supported underbody;

a side body conveyor mounted on said slide rail means and movable in opposite directions along the side body conveyor path;

a stool having a pallet mounting surface for removably supporting a pallet, said stool being mounted on said side body conveyor to pivot about a horizontal axis substantially perpendicular to the side body positioning path for positioning the plane of the pallet mounting surface in a first position substantially parallel to the upper surface of the frame and in a second position substantially perpendicular to the upper surface of the frame, said stool being disposed between the extreme front edge and the rear edge of the frame at times when said pallet mounting surface is in the first position;

first means mounted on said upper surface of the frame for moving the coveyor along the rail means in the forward direction to a welding location for positioning the pallet mounting surface forward of the extreme forward edge of the upper frame surface; and second means mounted on said side body conveyor operative to pivot said stool from the first to the second position for placing the pallet mounting surface at the welding location for welding the supported underbody to the sidebody.

4. The system of claim 3 wherein said pallet has a lower edge, and said stool includes means for supporting said pallet at a level wherein said lower edge is at least the level of the upper surface of the frame above the floor level when in the welding location.

* * * * *